US010992249B2

(12) United States Patent
Gondo et al.

(10) Patent No.: US 10,992,249 B2
(45) Date of Patent: Apr. 27, 2021

(54) POWER CONVERSION DEVICE FOR ELECTRIC VEHICLE

(71) Applicant: Mitsubishi Electric Corporation, Tokyo (JP)

(72) Inventors: Ryota Gondo, Tokyo (JP); Sho Kato, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 0 days.

(21) Appl. No.: 16/484,283

(22) PCT Filed: Feb. 24, 2017

(86) PCT No.: PCT/JP2017/007231
§ 371 (c)(1),
(2) Date: Aug. 7, 2019

(87) PCT Pub. No.: WO2018/154736
PCT Pub. Date: Aug. 30, 2018

(65) Prior Publication Data
US 2020/0007066 A1 Jan. 2, 2020

(51) Int. Cl.
H02P 27/06 (2006.01)
H02P 29/60 (2016.01)
(52) U.S. Cl.
CPC .............. H02P 27/06 (2013.01); H02P 29/60 (2016.02)
(58) Field of Classification Search
CPC .......... H02P 27/08; H02P 29/60; H02P 21/00; H02P 27/06; H02P 21/16; H02P 23/14
See application file for complete search history.

(56) References Cited

U.S. PATENT DOCUMENTS 8,174,222 B2 * 5/2012 Patel ...................... G05B 11/28
318/400.32
9,166,518 B2 * 10/2015 Campbell ............... H02P 29/66
2010/0308966 A1 12/2010 Oki et al.
(Continued)

FOREIGN PATENT DOCUMENTS

EP 2950626 A1 12/2015
JP 048192 A 1/1992
(Continued)

OTHER PUBLICATIONS

International Search Report (PCT/ISA/210) dated Apr. 25, 2017, by the Japan Patent Office as the International Searching Authority for International Application No. PCT/JP2017/007231.
(Continued)

Primary Examiner — Rina I Duda
(74) Attorney, Agent, or Firm — Buchanan Ingersoll & Rooney PC

(57) ABSTRACT

A power conversion device for an electric vehicle includes an inverter that drives a motor mounted in an electric vehicle, and a controller that controls the inverter based on an operation command. The controller includes a sensorless control unit, and corrects an initial resistance value set in the controller, based on temperature information of a temperature sensor mounted in a cooler, sets a resistance value of the motor to the corrected initial resistance value, and causes the sensorless control unit to operate based on the set resistance value.

10 Claims, 6 Drawing Sheets

(56) References Cited

U.S. PATENT DOCUMENTS

| | | | |
|---|---|---|---|
| 2012/0209467 A1 | 8/2012 | Kono et al. | |
| 2014/0117909 A1* | 5/2014 | Kim | H02P 7/06 |
| | | | 318/473 |
| 2015/0194918 A1 | 7/2015 | Yamashita et al. | |
| 2015/0236626 A1* | 8/2015 | Ota | H02P 6/28 |
| | | | 318/400.02 |
| 2016/0036359 A1* | 2/2016 | Nagata | H02P 29/032 |
| | | | 318/400.1 |

FOREIGN PATENT DOCUMENTS

| | | | |
|---|---|---|---|
| JP | 04364384 | A | 12/1992 |
| JP | 2002252995 | A | 9/2002 |
| JP | 2007049837 | A | 2/2007 |
| JP | 2008005615 | A | 1/2008 |
| JP | 5777814 | B2 | 9/2015 |
| JP | 2015226407 | A | 12/2015 |
| WO | 2009072448 | A1 | 6/2009 |
| WO | 2011080822 | A1 | 7/2011 |

OTHER PUBLICATIONS

Office Action dated Sep. 3, 2019, issued in Japanese Patent Application No. 2019-500973, 5 pages including 3 pages of English translation.

* cited by examiner

POWER CONVERSION DEVICE FOR ELECTRIC VEHICLE

FIELD

The present invention relates to a power conversion device for an electric vehicle which can start an alternating-current rotating machine without using a speed detector, and more particularly relates to a power conversion device for an electric vehicle which estimates a resistance value of an alternating-current rotating machine.

BACKGROUND

Control for starting an alternating-current rotating machine without using a speed detector is referred to as "speed sensorless control". In recent years, it is common to employ speed sensorless control for an induction machine and employ position sensorless control for a synchronous machine. In speed sensorless control, it is important to know the resistance value of an induction machine or a synchronous machine. The resistance value of a motor that is an alternating-current rotating machine for an electric vehicle varies depending on a temperature. Therefore, in the motor, if an error is caused between a resistance value set on the control side and an actual resistance value, a desired output torque cannot obtained in some cases. Particularly, when the error is large, an electric vehicle may not be started in some cases.

As a conventional technique for overcoming these problems, Patent Literature 1 listed below describes a method of detecting a voltage applied to an induction machine for driving an electric vehicle and a current inputted to the induction machine from the time of start of the electric vehicle until a time at which the speed of the electric vehicle is in a low-speed range, and then estimating a primary resistance and a secondary resistance of the induction machine. Further, Patent Literature 2 listed below describes a method of temporarily applying a direct-current voltage or a pulsating voltage to an induction machine for a certain period immediately after rising of an operation command from zero, and then estimating a primary resistance and a secondary resistance of the induction machine.

Both the methods of Patent Literatures 1 and 2 described above relate a method of measuring the resistance of a motor when the speed of an electric vehicle is in a low-speed range, wherein it is difficult to accurately estimate a primary resistance and a secondary resistance of a motor that is rotating. The reason why it is difficult is that a mutual inductance, a primary leakage inductance, and a secondary leakage inductance emerge when the motor rotates, and so the resultant value is a value containing impedance other than the primary resistance and the secondary resistance.

Meanwhile, Patent Literature 3 listed below describes a method performed with a speed determination unit that determines that the speed of an alternating-current rotating machine is zero, in which a primary resistance and a secondary resistance of the alternating-current rotating machine are calculated based on an orthogonal-axis current, a voltage command, and a power-running command, when the speed determination unit determines that the speed of the alternating-current rotating machine is zero and an operation command is changed from a braking command to a power-running command.

While the techniques of Patent Literatures 1 and 2 described above have a difficulty in obtaining accurate resistance values because of an inductance component caused by rotation of an alternating-current rotating machine controlled in the speed sensorless control, an operation mode of Patent Literature 3 described above can obtain more accurate resistance values as compared with the techniques of Patent Literatures 1 and 2 described above, because this operation mode estimates a primary resistance and a secondary resistance after input of a power-running command before rotation of an alternating-current rotating machine, that is, when a d-axis voltage command and a d-axis current detected value are obtained and an angular frequency is zero.

CITATION LIST

Patent Literatures

Patent Literature 1: Japanese Patent Application Laid-open No. H4-8192
Patent Literature 2: Japanese Patent Application Laid-open No. H4-364384
Patent Literature 3: Japanese Patent No. 5777814

SUMMARY

Technical Problem

All of the disclosures of Patent Literatures 1 to 3 described above use a method of starting a control system that estimates a resistance value of a motor to estimate the resistance value. However, a condition has to be satisfied in order to start the control system. If the condition is not satisfied, it is common to use a default value as a resistance estimated value. Nevertheless, because the resistance value of a motor largely depends on the outside temperature or the temperature of the motor itself, a large difference may be caused between the default value and an actual resistance value of the motor, and thereby there has been a problem in that control on the motor is significantly affected.

The present invention has been achieved in view of the above problems, and an object of the present invention is to provide a power conversion device for an electric vehicle that can improve the accuracy of estimating a resistance value of a motor even during a period in which a control system for estimating the resistance value of the motor cannot be started.

Solution to Problem

In order to solve the above problems and achieve the object, a power conversion device for an electric vehicle according to the present invention comprises: an inverter to drive a motor mounted in an electric vehicle; and a controller to control the inverter based on an operation command. The controller includes a sensorless control unit, and corrects an initial resistance value set in the controller, based on temperature information of a temperature sensor provided in the power conversion device or temperature information transmitted from outside of the power conversion device, sets a resistance value of the motor to the corrected initial resistance value, and causes the sensorless control unit to operate based on the set resistance value of the motor.

Advantageous Effects of Invention

According to the present invention, there is an advantageous effect that the accuracy of estimating a resistance value of a motor can be improved even during a period in which a control system for estimating the resistance value of the motor cannot be started.

DESCRIPTION OF EMBODIMENTS

A power conversion device for an electric vehicle according to embodiments of the present invention (hereinafter, simply referred to as "power conversion device") will be described in detail below with reference to the drawings. The present invention is not necessarily limited by the following embodiments.

First Embodiment

Figure 1:
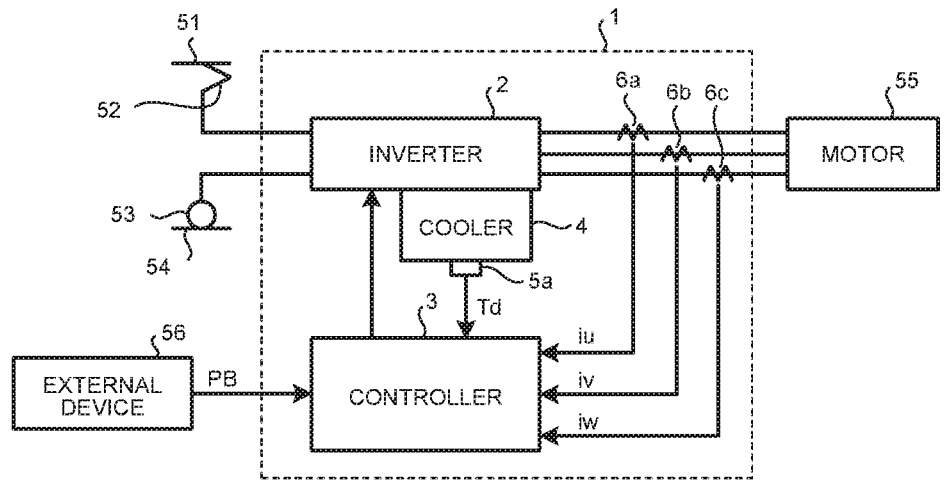
FIG. 1 is a diagram illustrating a configuration example of an electric vehicle driving system that includes a power conversion device for an electric vehicle according to a first embodiment.

FIG. 1 is a diagram illustrating a configuration example of a vehicle driving system that includes a power conversion device 1 according to a first embodiment. The power conversion device 1 according to the first embodiment includes an inverter 2 that converts direct-current power to alternating-current power and supplies the alternating-current power obtained by the conversion to a motor 55 to thereby drive the motor 55, a controller 3 that generates a voltage command V* for executing PWM control on the inverter 2 and outputs the generated command to the inverter 2, and current detectors 6a, 6b, and 6c arranged on the alternating-current side of the inverter 2 to detect phase currents flowing to respective phases of the motor 55. An example of the motor 55 mounted in an electric vehicle is an induction motor or a synchronous motor. A general electric vehicle uses an induction motor or a synchronous motor.

One end on the direct-current side of the inverter 2 is connected to an overhead line 51 via a current collector 52, and another end on the direct-current side of the inverter 2 is connected to a rail 54 that provides an electric ground potential via a wheel 53. Direct-current power supplied from the overhead line 51 is supplied to the inverter 2 via the current collector 52.

In the controller 3, an operation command PB is inputted from an external device 56, a temperature detected value Td is inputted from a temperature sensor 5a, and current detected values iu, iv, and iw are inputted from the current detectors 6a, 6b, and 6c. In the example of FIG. 1, the temperature sensor 5a is mounted on a cooler 4. The cooler 4 is provided for cooling switching elements (not illustrated) included in the inverter 2. An example of the external device 56 is a driver's cab of an electric vehicle. In an electric vehicle having a general configuration, the cab is provided in a command vehicle.

Although FIG. 1 illustrates a case of using a current transformer (CT) for the current detectors 6a, 6b, and 6c as an example, the current detectors 6a, 6b, and 6c are not limited to the CTs, and may be configured to detect phase currents using other publicly known techniques. In addition, although FIG. 1 illustrates a configuration of including three current detectors 6a, 6b, and 6c as an example, the invention is not limited to such a configuration. Any one of the three current detectors 6a, 6b, and 6c may be omitted if a relation of iu+iv+iw=0 that is a three-phase equilibrium condition is used.

Figure 2:
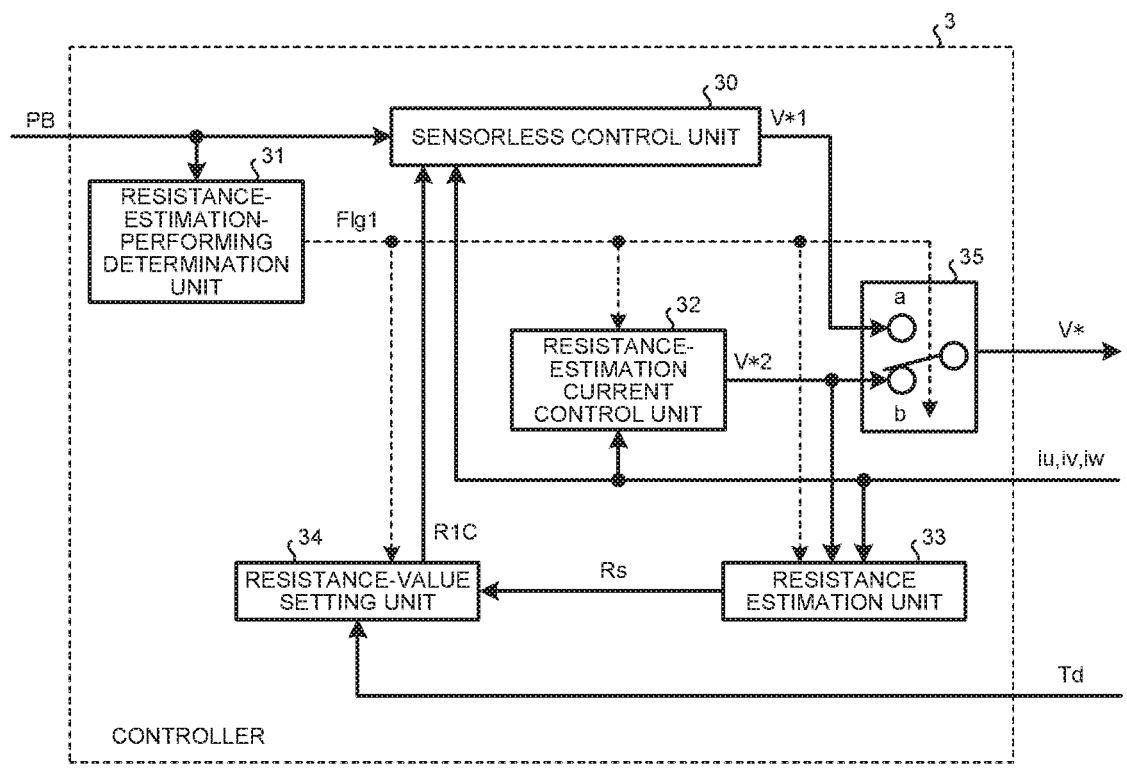
FIG. 2 is a block diagram illustrating a configuration example of a controller in the first embodiment.

FIG. 2 is a block diagram illustrating a configuration example of the controller 3 according to the first embodiment. The controller 3 includes a sensorless control unit 30, a resistance-estimation-performing determination unit 31, a resistance-estimation current control unit 32, a resistance estimation unit 33, a resistance-value setting unit 34, and a signal switch 35 as illustrated in FIG. 2.

An operation command PB from the external device 56, current detected values iu, iv, and iw detected by the current detectors 6a, 6b, and 6c, and a resistance value R1C set by the resistance-value setting unit 34 are inputted to the sensorless control unit 30. A resistance value set by the resistance-value setting unit 34 is referred to as "resistance set value". The sensorless control unit 30 generates a first voltage command V*1 using the operation command PB, the current detected values iu, iv, and iw, and the resistance set value R1C. The first voltage command V*1 generated by the sensorless control unit 30 is inputted to the signal switch 35.

The configuration of the sensorless control unit 30 is publicly known, and so detailed descriptions thereof are omitted herein. The specific configuration thereof are disclosed in Japanese Patent No. 4459301, and one can refer to the contents of the patent publication.

The operation command PB is also inputted to the resistance-estimation-performing determination unit 31. The resistance-estimation-performing determination unit 31 generates a resistance-estimation performing flag Flg1 at a timing when the operation command PB is inputted. The resistance-estimation performing flag Flg1 generated by the resistance-estimation-performing determination unit 31 is inputted to each of the resistance-estimation current control unit 32, the resistance estimation unit 33, the resistance-value setting unit 34, and the signal switch 35. The resistance-estimation performing flag Flg1 is a timing signal for starting a control system for estimation of a resistance value, that is, a trigger signal for starting control for estimation of a resistance value.

When the resistance-estimation performing flag Flg1 is inputted, the resistance-estimation current control unit 32 generates a second voltage command V*2 suitable for estimation of a resistance value of the motor 55 using the current detected values iu, iv, and iw. The second voltage command V*2 generated by the resistance-estimation current control unit 32 is inputted to the signal switch 35.

When the resistance-estimation performing flag Flg1 is inputted, the resistance estimation unit 33 performs calculation for estimating a resistance estimated value Rs using the second voltage command V*2 generated by the resistance-estimation current control unit 32 and the current detected values iu, iv, and iw. The resistance estimated value Rs estimated by the resistance estimation unit 33 is inputted to the resistance-value setting unit 34.

When the resistance-estimation performing flag Flg1 is inputted, the resistance-value setting unit 34 outputs the resistance set value R1C retained in the resistance-value setting unit 34 to the sensorless control unit 30. The resistance-value setting unit 34 will be described in detail later.

The configurations of the resistance-estimation-performing determination unit 31, the resistance-estimation current control unit 32, and the resistance estimation unit 33 are publicly known, and so their detailed descriptions are omitted herein. The specific configurations of the units are disclosed in Patent Literature 3 (Japanese Patent No. 5777814) listed above, and so one can refer to the contents of its patent publication. Further, the configuration of the resistance estimation unit 33 is also disclosed in Japanese Patent No. 3771239 and Japanese Patent No. 4738549 that are described as prior arts in Patent Literature 3, and the techniques disclosed in these prior art documents may be also employed for the resistance estimation unit 33.

Referring back to FIG. 2, the signal switch 35 selects either the first voltage command V*1 generated by the sensorless control unit 30 or the second voltage command V*2 generated by the resistance-estimation current control unit 32 in accordance with the resistance-estimation performing flag Flg1, and outputs the selected command to outside of the controller 3. More specifically, while the resistance-estimation performing flag Flg1 is outputted, a switching contact of the signal switch 35 is connected to the b-side, so that the second voltage command V*2 generated by the resistance-estimation current control unit 32 is outputted to the outside of the controller 3. On the other hand, when the resistance-estimation performing flag Flg1 is not outputted, the switching contact of the signal switch 35 is connected to the a-side, so that the first voltage command V*1 generated by the sensorless control unit 30 is outputted to the outside of the controller 3. The outline of the operation of the controller 3 is as described above.

Figure 3:
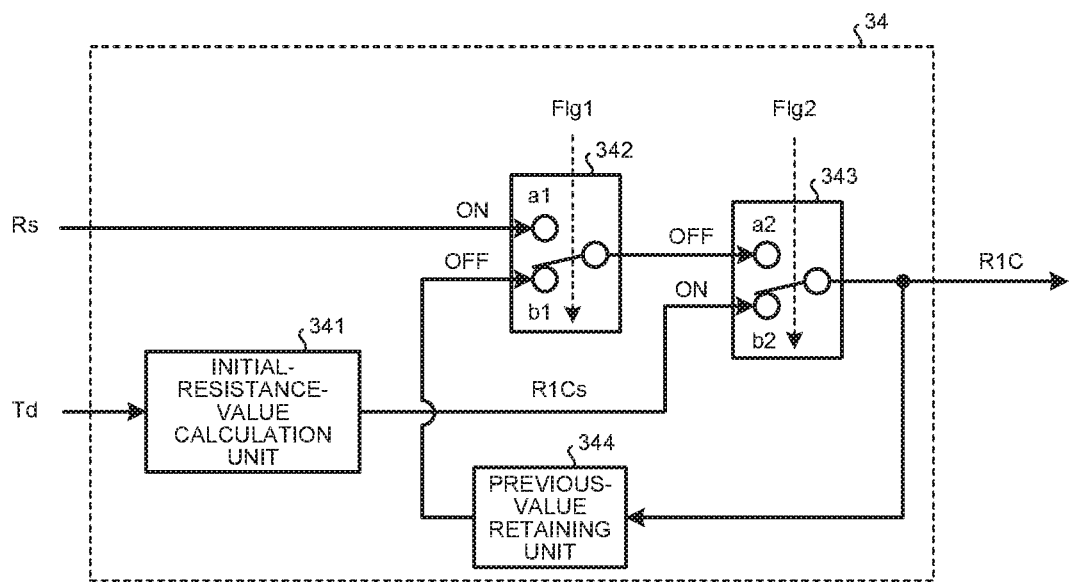
FIG. 3 is a block diagram illustrating a detailed configuration of a resistance-value setting unit in the first embodiment.
Figure 4:
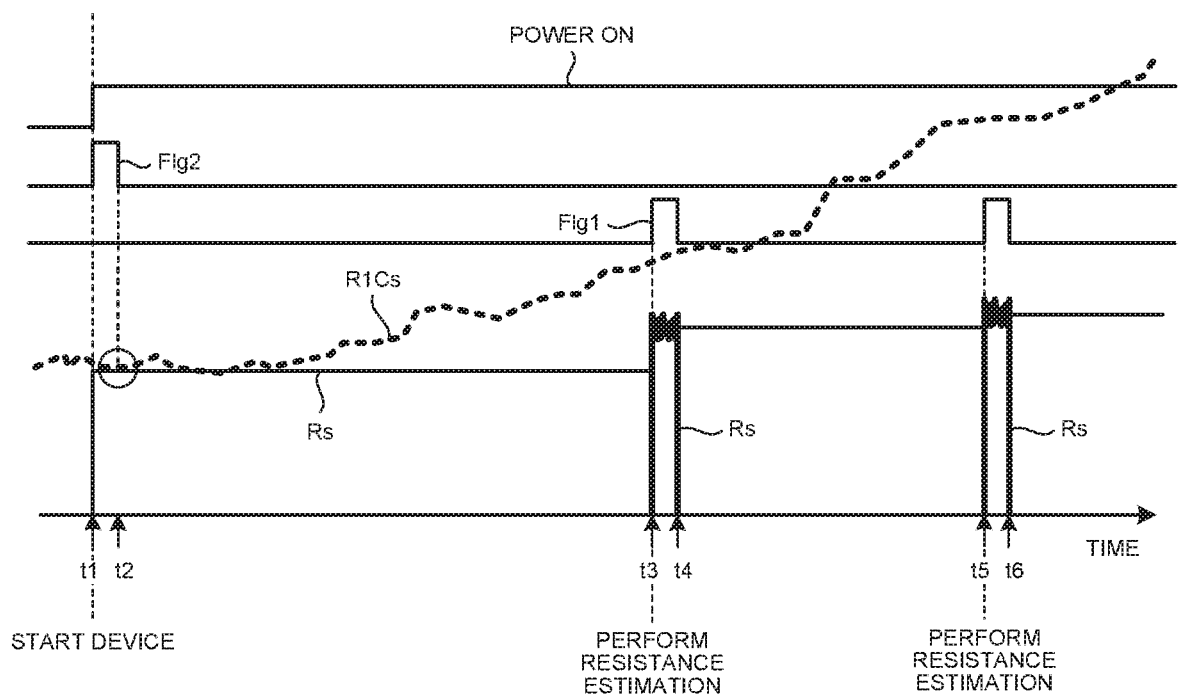
FIG. 4 is a time chart illustrating a situation of change of a resistance set value set by the resistance-value setting unit of the first embodiment.
Figure 5:
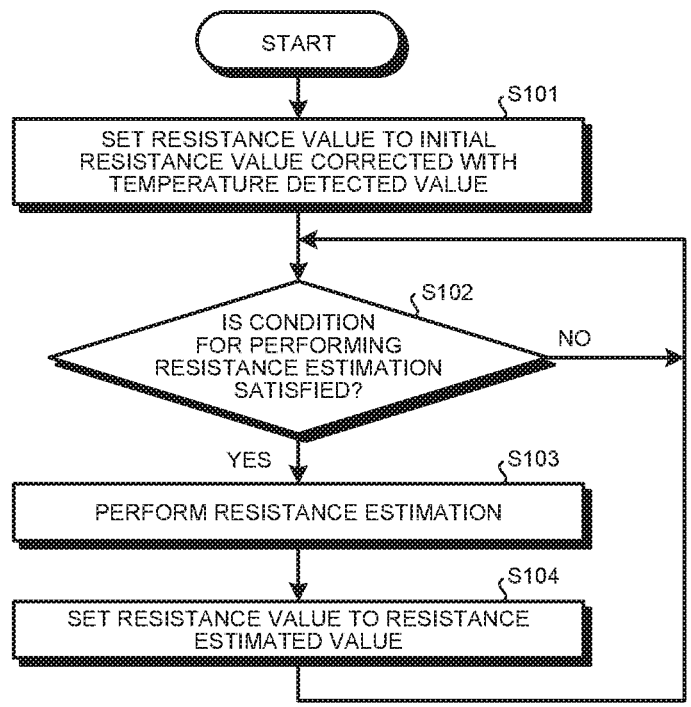
FIG. 5 is a flowchart illustrating an operation flow of a resistance estimation unit and the resistance-value setting unit in the first embodiment.

Next, a detailed operation of the controller 3 in the first embodiment is described with reference to FIGS. 2 to 5. FIG. 3 is a block diagram illustrating a detailed configuration of the resistance-value setting unit 34 in the first embodiment. FIG. 4 is a time chart illustrating a situation of change of a resistance set value R1C set by the resistance-value setting unit 34 of the first embodiment. FIG. 5 is a flowchart illustrating an operation flow of the resistance estimation unit 33 and the resistance-value setting unit 34 in the first embodiment.

The resistance-value setting unit 34 includes an initial-resistance-value calculation unit 341, signal switches 342 and 343, and a previous-value retaining unit 344, as illustrated in FIG. 3. A temperature detected value Td is inputted to the initial-resistance-value calculation unit 341. The initial-resistance-value calculation unit 341 generates an initial resistance value R1Cs using the temperature detected value Td. The initial resistance value R1Cs generated by the initial-resistance-value calculation unit 341 is inputted to the signal switch 343.

The function of the initial-resistance-value calculation unit 341 may be realized by a table or by using the following expression.

$$R1Cs = R0\{1+\alpha(Td-T0)\} \quad (1)$$

In the above expression (1), R1Cs is an initial resistance value, R0 is a reference resistance value, α is a temperature coefficient, and T0 is a reference temperature.

Further, in a case where motor windings are made of copper, the following expression may be used to realize the function.

$$R1Cs = R0\{(234.5+Td)/(234.5+T0)\} \quad (2)$$

The previous-value retaining unit 344 retains an output of the signal switch 343, that is, the resistance set value R1C that is an output value of the resistance-value setting unit 34. An output of the previous-value retaining unit 344 is inputted to the signal switch 342.

The signal switch 342 selects either the resistance estimated value Rs or the output of the previous-value retaining unit 344 depending on the resistance-estimation performing flag Flg1 and outputs the selected one to the signal switch 343. More specifically, when the resistance-estimation performing flag Flg1 is not outputted, a switching contact of the signal switch 342 is connected to the b1-side, so that the output of the previous-value retaining unit 344 is selected and outputted to the signal switch 343. Meanwhile, when the resistance-estimation performing flag Flg1 is outputted, the switching contact of the signal switch 342 is connected to the a1-side, so that the resistance estimated value Rs is selected and outputted to the signal switch 343.

Further, while a device starting flag Flg2 is outputted, a switching contact of the signal switch 343 is connected to the b2-side, so that the initial resistance value R1Cs generated by the initial-resistance-value calculation unit 341 is selected and outputted as the resistance set value R1C. Meanwhile, when the device starting flag Flg2 is not outputted, the switching contact of the signal switch 343 is connected to the a2-side, so that an output of the signal switch 342 is selected and outputted as the resistance set value R1C.

FIG. 4 illustrates a situation of change of the resistance set value R1C. When a device is started at a time t1, the device starting flag Flg2 is generated, and an ON pulse is outputted until a time t2, as illustrated in FIG. 4. When the device starting flag Flg2 falls at the time t2, the switching contact of the signal switch 343 in FIG. 3 is connected to the a2-side. By this operation, the signal switch 342, the signal switch 343, and the previous-value retaining unit 344 form a loop. Therefore, immediately before the contact of the signal switch 343 is switched to the a2-side, the initial resistance value R1Cs generated by the initial-resistance-value calculation unit 341 is retained and latched by the previous-value retaining unit 344.

Further, in FIG. 4, a waveform denoted with a thick broken line is a waveform of the initial resistance value R1Cs generated by the initial-resistance-value calculation unit 341. The initial resistance value R1Cs at the time t2, denoted with a circle, is set as the resistance set value R1C, and is maintained until resistance estimation is performed.

When the resistance-estimation performing flag Flg1 is outputted at a time t3, the switching contact of the signal switch 342 in FIG. 3 is connected to the a1-side, so that the resistance estimated value Rs is set as the resistance set value R1C and a value at a time t4 at which the resistance-estimation performing flag Flg1 falls is retained and latched. When resistance estimation is performed again at a time t5, a value at a time t6 at which the resistance-estimation performing flag Flg1 falls is retained and latched.

FIG. 3 illustrates a configuration example when the function of the resistance-value setting unit 34 is implemented by hardware. Meanwhile, when the function of the resistance-value setting unit 34 including the resistance estimation unit 33 is implemented by software, the flowchart illustrated in FIG. 5 can be used.

As illustrated in FIG. 4, the device starting flag Flg2 is outputted before the resistance-estimation performing flag Flg1 is outputted. Therefore, first, a resistance value is set to an initial resistance value corrected using a temperature detected value as illustrated at Step S101 of FIG. 5. At Step S102, it is determined whether or not a condition for performing resistance estimation is satisfied. If the condition for performing resistance estimation is not satisfied (NO at Step S102), resistance estimation is not performed, and so the process of Step S102 is repeated. On the other hand, if the condition for performing resistance estimation is satisfied (YES at Step S102), resistance estimation is performed at Step S103, and the resistance value is set to a resistance estimated value at Step S104.

As described above, the power conversion device according to the first embodiment corrects an initial resistance value using a temperature detected value and sets the resistance value of a motor to the corrected initial resistance value before estimating the resistance value of the motor. Therefore, it is possible to improve the accuracy of estimating a resistance value of a motor even during a period in which a control system for estimating the resistance value of the motor cannot be started.

Further, the power conversion device according to the first embodiment is configured in such a manner that a corrected initial resistance value is retained in a resistance-value setting unit, and the resistance-value setting unit outputs the initial resistance value to a sensorless control unit until receiving a resistance estimated value from a resistance estimation unit, and outputs the resistance estimated value to the sensorless control unit after receiving the resistance estimated value from the resistance estimation unit. Therefore, it is possible to smoothly execute control for estimating a resistance value of a motor before and after the start of a control system for estimating a resistance value of the motor.

Although the temperature sensor 5a is mounted in the cooler 4 in FIG. 1, it is possible that the temperature sensor 5a is mounted in a portion other than the cooler 4 in the power conversion device 1. When the temperature sensor 5a is mounted in the power conversion device 1, there is an advantageous effect that a wiring line for transmitting the temperature detected value Td to the controller 3 can be more easily drawn around as compared to a case of mounting a temperature sensor in the motor 55.

Further, in a case where a train formed by a plurality of electric vehicles includes a train-information management device, the power conversion device may be configured to receive temperature information managed by the train-information management device without equipping the temperature sensor 5a. The train-information management device manages information of an outside air temperature or temperature information of an air-conditioning device, and can improve the accuracy of estimating a resistance value of the motor 55 by receiving such temperature information and accordingly correcting the initial resistance value.

Figure 6:
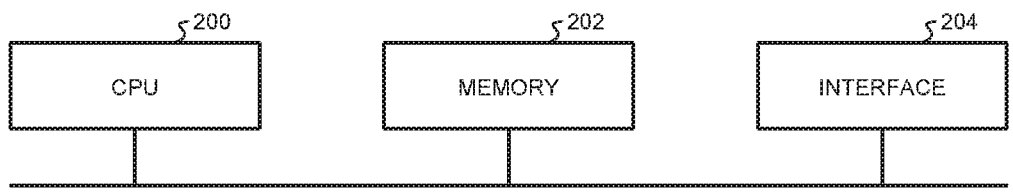
FIG. 6 is a block diagram illustrating an example of a hardware configuration that realizes the controller in the first embodiment.
Figure 7:
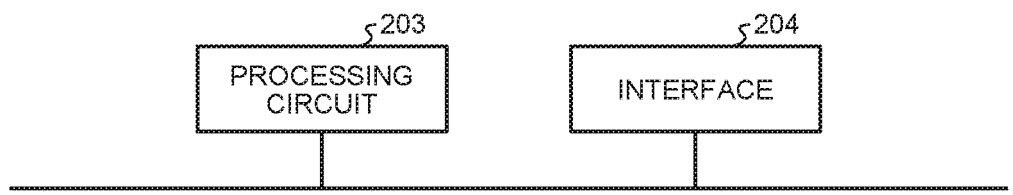
FIG. 7 is a block diagram illustrating another example of the hardware configuration that realizes the controller in the first embodiment.

As ending of the description of the first embodiment, a hardware configuration that realizes the function of the controller 3 in the first embodiment is described with reference to FIGS. 6 and 7. FIG. 6 is a block diagram illustrating an example of a hardware configuration that realizes the controller 3 in the first embodiment. FIG. 7 is a block diagram illustrating another example of the hardware configuration that realizes the controller 3 according to the first embodiment.

In order to implement the function of the controller 3 described above, a configuration may be employed which includes a CPU (Central Processing Unit) 200 that performs calculation, a memory 202 that stores therein a program to be read by the CPU 200, and an interface 204 that inputs and outputs signals, as illustrated in FIG. 6. The CPU 200 may be a calculation means such as a microprocessor, a microcomputer, a processor, a DSP (Digital Signal Processor), or the like. The memory 202 corresponds to a nonvolatile or volatile semiconductor memory such as a RAM (Random Access Memory), a ROM (Read Only Memory), a flash memory, an EPROM (Erasable Programmable ROM), an EEPROM (Electrically EPROM), or the like.

Specifically, the memory 202 has stored therein a program for implementing the functions of the controller 3. The CPU 200 transmits and receives necessary information via the interface 204 to thereby perform various types of calculation processing explained in the first embodiment.

The CPU 200 and the memory 202 illustrated in FIG. 6 may be replaced by a processing circuit 203 as illustrated in FIG. 7. The processing circuit 203 corresponds to, for example, a single circuit, a composite circuit, a programmed processor, a parallel-programmed processor, an ASIC (Application Specific Integrated Circuit), an FPGA (Field-Programmable Gate Array), or any combination of them.

Second Embodiment

Figure 8:
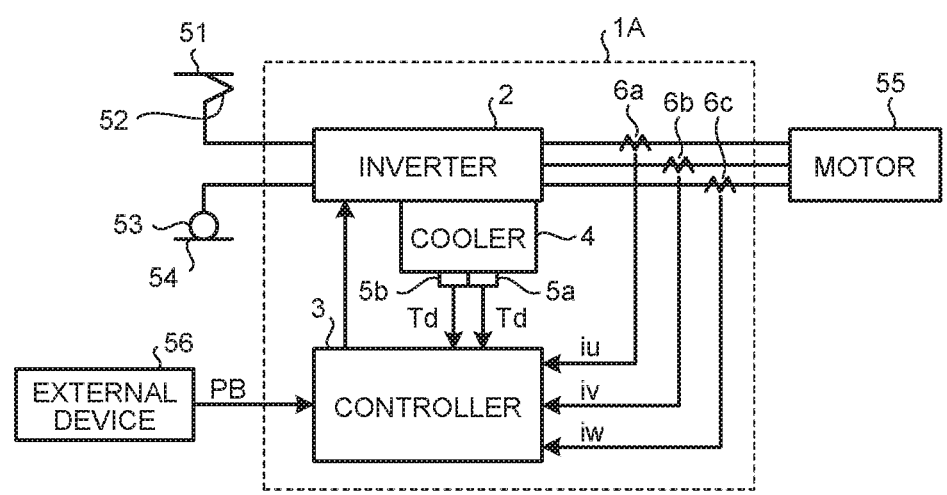
FIG. 8 is a diagram illustrating a configuration example of a vehicle driving system that includes a power conversion device according to a second embodiment.

FIG. 8 is a diagram illustrating a configuration example of a vehicle driving system that includes a power conversion device 1A according to a second embodiment. The power conversion device 1A according to the second embodiment is configured by including a temperature sensor 5b that is a second temperature sensor, in addition to the temperature sensor 5a, in the power conversion device 1 according to the first embodiment illustrated in FIG. 1. Other configurations of the second embodiment are like or equivalent to the configurations of the first embodiment illustrated in FIG. 1, and thus like or equivalent constituent parts are denoted by like reference signs and redundant explanations thereof are omitted.

Figure 9:
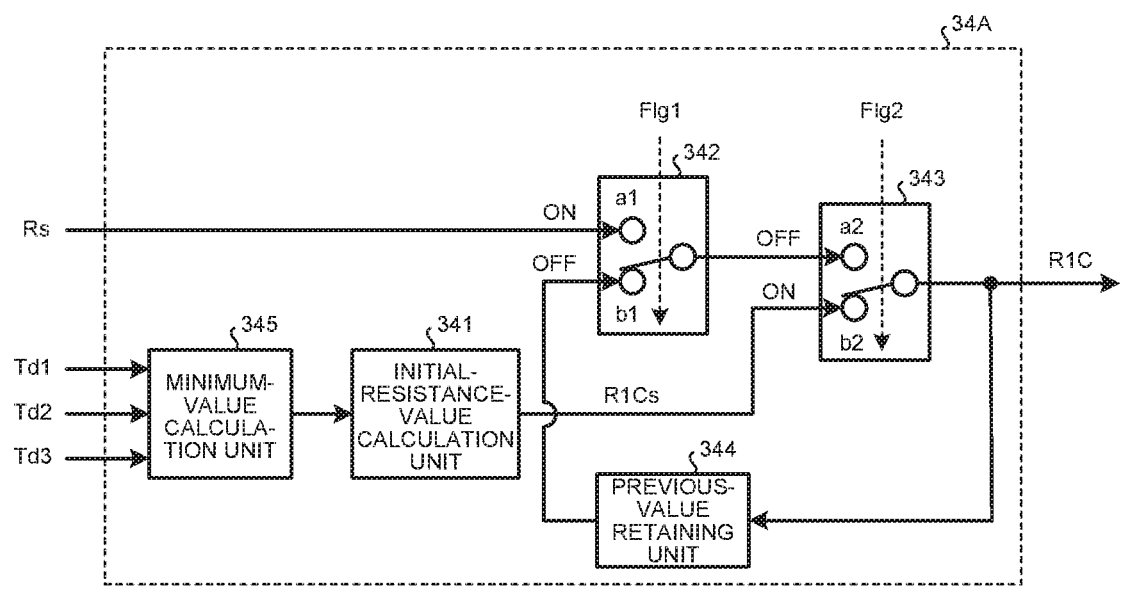
FIG. 9 is a block diagram illustrating a detailed configuration of a resistance-value setting unit in the second embodiment.

FIG. 9 is a block diagram illustrating a detailed configuration of a resistance-value setting unit 34A in the second embodiment. The resistance-value setting unit 34A in the second embodiment corresponds to the resistance-value setting unit 34 in the first embodiment illustrated in FIG. 3 additionally having a minimum-value calculation unit 345 provided on an input side of the initial-resistance-value calculation unit 341. Three temperature detected values Td1, Td2, and Td3 are inputted to the minimum-value calculation unit 345. The configuration of FIG. 9 is based on the assumption that the temperature detected value Td1 is temperature information from the temperature sensor 5a, the temperature detected value Td2 is temperature information from the temperature sensor 5b, and the temperature detected value Td3 is temperature information from a third temperature sensor that is not illustrated in FIG. 9. Other configurations of the resistance-value setting unit 34A are like or equivalent to the configuration of the resistance-value setting unit 34 illustrated in FIG. 3, and thus like or equivalent constituent parts are denoted by like reference signs and redundant explanations thereof are omitted.

Next, an operation of the resistance-value setting unit 34A according to the second embodiment is described. As described above, the three temperature detected values Td1, Td2, and Td3 are inputted to the minimum-value calculation unit 345. The minimum-value calculation unit 345 selects the minimum one of the three temperature detected values Td1, Td2, and Td3 and outputs the selected value to the initial-resistance-value calculation unit 341. The initial-resistance-value calculation unit 341 calculates the initial resistance value R1Cs by using the above expression (1) or (2) based on temperature information transmitted from the minimum-value calculation unit 345. Subsequent operations of the resistance-value setting unit 34A are identical to those in the first embodiment.

Next, the significance of providing the minimum-value calculation unit 345 is described. The second embodiment corrects information on an initial resistance value managed by the power conversion device 1A using information from a temperature sensor mounted in a portion other than the motor 55 or temperature information received from outside of the power conversion device 1A. In such an embodiment, because a pattern of increase of the temperature of the motor 55 and a pattern of increase of the temperature of the power conversion device 1A or outside air are different from each other, use of inappropriate temperature information lowers the accuracy of estimating the resistance value of the motor 55. Further, in a case where there is a variation in an estimated resistance value, it is possible to more reduce an influence of lowering of controllability when the estimated resistance value is deviated to a smaller value than when the estimated resistance value is deviated to a larger value. Therefore, the second embodiment using a plurality of temperature detected values employs a configuration that selects the minimum one of two or more pieces of temperature information.

In the configuration of FIG. 9, temperature information from a train-information management device may be added to the temperature information to be inputted to the minimum-value calculation unit 345. However, it is likely that the temperature information from the train-information management device considerably deviates from information from the other temperature sensors. In this case, it is conceivable that the deviated temperature information is selected to perform estimation of a resistance value of the motor 55. Therefore, in an embodiment that uses temperature information other than information from a temperature sensor, an average value of the plural pieces of temperature information may be calculated and an initial resistance value may be corrected using the average value. Further, in a case where there is a variation in the estimated resistance value, it is possible to more reduce an influence of lowering of controllability when the estimated resistance value is deviated to a smaller value than when it is deviated to a larger value. Therefore, in a case of using temperature information from the train-information management device, a configuration may be employed in which the minimum one of the plural pieces of temperature information is selected, as with the above example.

Third Embodiment

Figure 10:
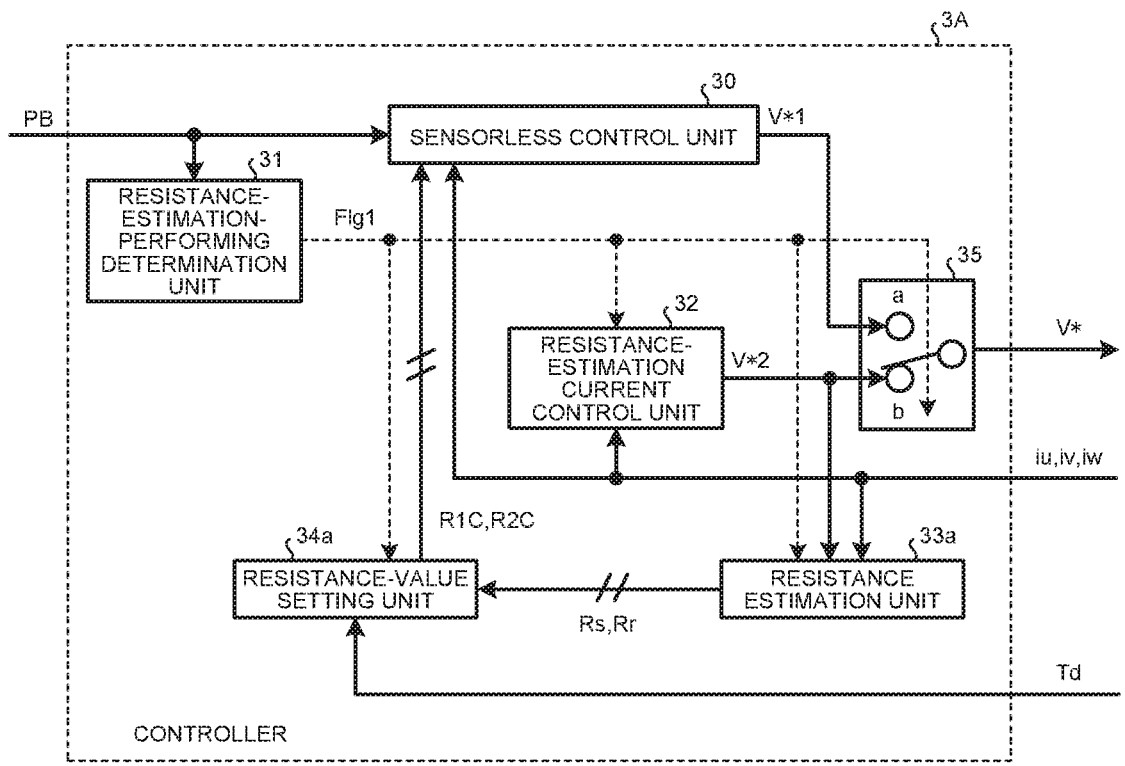
FIG. 10 is a block diagram illustrating a configuration example of a controller 3A in a third embodiment.

FIG. 10 is a block diagram illustrating a configuration example of a controller 3A in a third embodiment. The controller 3 in the first embodiment illustrated in FIG. 2 is configured in such a manner that the resistance estimation unit 33 calculates the resistance estimated value Rs and the resistance-value setting unit 34 outputs the resistance set value R1C retained in the resistance-value setting unit 34. In a case where the motor 55 is an induction machine, the resistance estimated value Rs is an estimated value of a primary resistance and the resistance set value R1C is a set value of the primary resistance, although descriptions thereof are omitted in the first embodiment. Meanwhile, the controller 3A in the third embodiment is configured in such a manner that a resistance estimation unit 33a calculates the resistance estimated value Rs that is an estimated value of a primary resistance and a resistance estimated value Rr that is an estimated value of a secondary resistance, and a resistance-value setting unit 34a outputs the resistance set value R1C that is a set value of the primary resistance and a resistance set value R2C that is a set value of the secondary resistance. In the third embodiment, Rs is referred to as "primary-resistance estimated value", Rr is referred to as "secondary-resistance estimated value", R1C is referred to as "primary-resistance set value", and R2C is referred to as "secondary-resistance set value" hereinbelow. Other configurations of the third embodiment are like or equivalent to the configurations of the first embodiment illustrated in FIG. 2, and thus like or equivalent constituent parts are denoted by like reference signs and redundant explanations thereof are omitted.

The resistance-value setting unit 34a has a function unit that calculates an initial resistance value, as with the configuration of the first embodiment illustrated in FIG. 3. The function of calculating the initial resistance value may be implemented by a table or by using the following expressions.

$$Rsc = Rs0\{1 + \alpha s(Td - T0)\} \quad (3)$$

$$Rrc = Rr0\{1 + \alpha r(Td - T0)\} \quad (4)$$

In the above expressions (3) and (4), Rsc is an initial primary resistance value, Rs0 is a reference primary resistance value, $\alpha s$ is a temperature coefficient of a primary winding, Rrc is an initial secondary resistance value, Rr0 is a reference secondary resistance value, $\alpha r$ is a temperature coefficient of a secondary winding, and T0 is a reference temperature.

Further, in a case where motor windings are made of copper, the following expressions may be used to implement the function.

$$Rsc = Rs0\{(234.5 + Td)/(234.5 + T0)\} \quad (5)$$

$$Rrc = Rr0\{(234.5 + Td)/(234.5 + T0)\} \quad (6)$$

Figure 11:
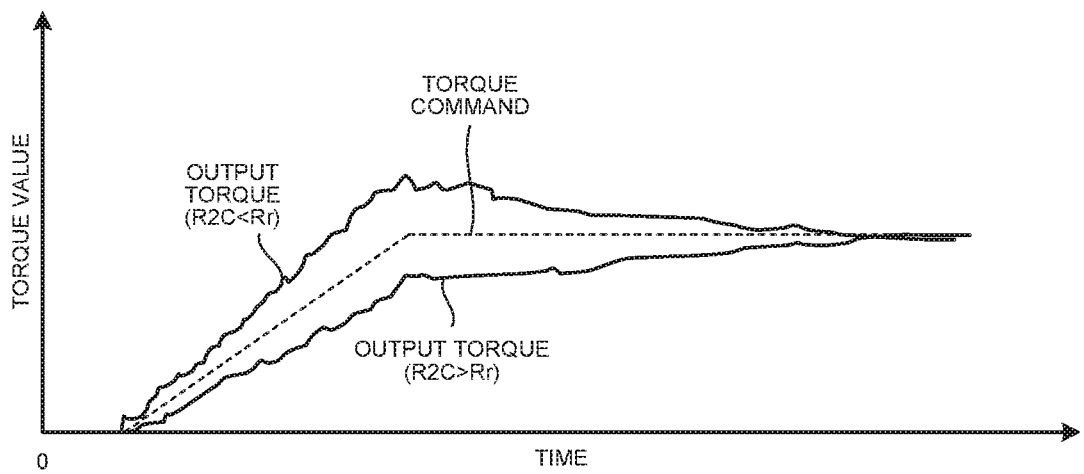
FIG. 11 is an explanatory diagram of an advantageous effect of a power conversion device according to the third embodiment.

Next, advantageous effects obtained by estimation of a secondary resistance of the motor 55 are described with reference to FIG. 11. FIG. 11 is an explanatory diagram of an advantageous effect of a power conversion device according to the third embodiment.

In FIG. 11, a waveform denoted with a broken line represents change of a torque command given from an upper control unit with time, and a waveform denoted with a thick solid line represents change of an output torque with time. Assuming that Rr is a true value of a secondary resistance of an induction machine, when R2C>Rr is satisfied for the secondary resistance set value R2C, a time required to follow the given torque command becomes long. Meanwhile, when R2C<Rr is satisfied for the secondary resistance set value R2C, an output torque larger than the given torque command is generated, and it takes much time for the output torque to return to the given torque command, and thus in this case, the time required to follow it becomes long, too.

Both values of a primary resistance and a secondary resistance of an induction machine are varied by temperature. The primary resistance contributes to stability of sensorless control, and the secondary resistance contributes to transient response of torque control. As illustrated in the waveform in FIG. 11, the accuracy of estimating a secondary resistance affects the transient response of torque control.

In the power conversion device according to the third embodiment, a secondary resistance is set using a secondary resistance estimated value in addition to a primary resistance. Therefore, it exerts an advantageous effect that a transient response performance of torque control can be improved in addition to good stability of sensorless control.

The configurations described in the above embodiments are only examples of the content of the present invention. The configurations can be combined with other publicly known techniques, and partially omitted and/or modified without departing from the scope of the present invention.

REFERENCE SIGNS LIST 1, 1A power conversion device; 2 inverter; 3, 3A controller; 4 cooler; 5a, 5b temperature sensor; 6a, 6b, 6c current detector; 30 sensorless control unit; 31 resistance-estimation-performing determination unit; 32 resistance-estimation current control unit; 33, 33a resistance estimation unit; 34, 34A, 34a resistance-value setting unit; 35, 342, 343 signal switch; 51 overhead line; 52 current collector; 53 wheel; 54 rail; 55 motor; 56 external device; 200 CPU; 202 memory; 203 processing circuit; 204 interface; 341 initial-resistance-value calculation unit; 344 previous-value retaining unit; 345 minimum-value calculation unit.

The invention claimed is:

1. A power conversion device for an electric vehicle comprising:
an inverter to drive a motor mounted in an electric vehicle; and
a controller to control the inverter based on an operation command,
wherein the controller
includes a sensorless control unit, and
corrects an initial resistance value set in the controller, based on temperature information of a temperature sensor provided in the power conversion device or temperature information transmitted from outside of the power conversion device, sets a resistance value of the motor to the corrected initial resistance value, and causes the sensorless control unit to operate based on the set resistance value of the motor, and
the controller further includes:
a resistance estimation unit to calculate a resistance estimated value that is an estimated value of the resistance value of the motor using a current flowing to the motor; and
a resistance-value setting unit to retain the corrected initial resistance value, output the initial resistance value to the sensorless control unit until receiving the resistance estimated value from the resistance estimation unit, and output the resistance estimated value to the sensorless control unit after receiving the resistance estimated value from the resistance estimation unit, wherein
the controller includes a resistance-estimation-performing determination unit to generate a resistance-estimation performing flag when receiving the operation command as an input, and to input the flag into the resistance estimation unit and the resistance-value setting unit,
the resistance estimation unit calculates, when receiving the resistance-estimation performing flag as an input, the resistance estimated value using an electric current flowing in the motor, and
the resistance-value setting unit outputs, when receiving the resistance-estimation performing flag as an input, the initial resistance value to the sensorless control unit.

2. The power conversion device for an electric vehicle according to claim 1, wherein
the resistance-value setting unit includes: an initial-resistance-value calculation unit to correct the initial resistance value based on the temperature information; a first signal switch to be caused to switch in dependence upon whether the resistance-estimation performing flag is outputted or not; a second signal switch to be caused to switch in dependence upon whether a device starting flag is outputted or not; and a previous-value retaining unit to retain a resistance set value that is an output value to be outputted from the second signal switch to the sensorless control unit,
the first signal switch receives the resistance estimated value and an output from the previous-value retaining unit as inputs, and when the resistance-estimation performing flag is not outputted, outputs an output from the previous-value retaining unit to the second signal switch, but when the resistance-estimation performing flag is outputted, outputs the resistance estimated value to the second signal switch, and
the second signal switch receives an output from the first signal switch and the initial resistance value corrected by the initial-resistance-value calculation unit as inputs, and when the device starting flag is outputted, outputs the initial resistance value corrected by the initial-resistance-value calculation unit as the resistance set value to the sensorless control unit, but when the device starting flag is not outputted, outputs an output from the first signal switch as the resistance set value to the sensorless control unit.

3. The power conversion device for an electric vehicle according to claim 1, wherein the temperature sensor is mounted on a cooler to cool a switching element included in the power conversion device.

4. The power conversion device for an electric vehicle according to claim 1, wherein the temperature information transmitted from the outside of the power conversion device is temperature information managed by a train-information management device equipped in the electric vehicle.

5. The power conversion device for an electric vehicle according to claim 1, wherein
the temperature information is a plurality of pieces of information, and
the resistance-value setting unit selects a minimum value of pieces of the temperature information and corrects the initial resistance value using the minimum value.

6. The power conversion device for an electric vehicle according to claim 1, wherein
the temperature information is a plurality of pieces of information, and
the resistance-value setting unit calculates an average value of pieces of the temperature information and corrects the initial resistance value using the average value.

7. The power conversion device for an electric vehicle according to claim 1, wherein
the motor is an induction machine,
the resistance estimation unit estimates a primary resistance and a secondary resistance of the induction machine, and
the resistance-value setting unit sets a primary resistance and a secondary resistance of the induction machine.

8. The power conversion device for an electric vehicle according to claim 5, wherein
the motor is an induction machine,
the resistance estimation unit estimates a primary resistance and a secondary resistance of the induction machine, and
the resistance-value setting unit sets a primary resistance and a secondary resistance of the induction machine.

9. The power conversion device for an electric vehicle according to claim 6, wherein
the motor is an induction machine,
the resistance estimation unit estimates a primary resistance and a secondary resistance of the induction machine, and
the resistance-value setting unit sets a primary resistance and a secondary resistance of the induction machine.

10. A power conversion device for an electric vehicle comprising:
an inverter to drive a motor mounted in an electric vehicle; and
a controller to control the inverter based on an operation command,
wherein the controller
includes a sensorless control unit, and
corrects an initial resistance value set in the controller, based on temperature information of a temperature sensor provided in the power conversion device or temperature information transmitted from outside of the power conversion device, sets a resistance value of the motor to the corrected initial resistance value, and causes the sensorless control unit to operate based on the set resistance value of the motor, and
the controller further includes:
a resistance estimation unit to calculate a resistance estimated value that is an estimated value of the resistance value of the motor using a current flowing to the motor; and
a resistance-value setting unit to retain the corrected initial resistance value, output the initial resistance value to the sensorless control unit until receiving the resistance estimated value from the resistance estimation unit, and output the resistance estimated value to the sensorless control unit after receiving the resistance estimated value from the resistance estimation unit, wherein
the temperature information is a plurality of pieces of information, and
the resistance-value setting unit calculates an average value of pieces of the temperature information and corrects the initial resistance value using the average value.

* * * * *